US012617927B2

(12) United States Patent
Kosai

(10) Patent No.: US 12,617,927 B2
(45) Date of Patent: May 5, 2026

(54) METHOD FOR CLEAVING COORDINATE BOND OF COMPLEX POLYMER

(71) Applicant: BRIDGESTONE CORPORATION, Tokyo (JP)

(72) Inventor: Tomoyuki Kosai, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 631 days.

(21) Appl. No.: 18/043,581

(22) PCT Filed: Aug. 2, 2021

(86) PCT No.: PCT/JP2021/028672
§ 371 (c)(1),
(2) Date: Mar. 1, 2023

(87) PCT Pub. No.: WO2022/049962
PCT Pub. Date: Mar. 10, 2022

(65) Prior Publication Data

US 2023/0323072 A1 Oct. 12, 2023

(30) Foreign Application Priority Data

Sep. 4, 2020 (JP) ................................ 2020-149345

(51) Int. Cl.
*C08J 11/28* (2006.01)

(52) U.S. Cl.
CPC .......... *C08J 11/28* (2013.01); *C08J 2300/106* (2013.01); *C08J 2300/30* (2013.01)

(58) Field of Classification Search
USPC ........................................................ 521/41
See application file for complete search history.

(56) References Cited

U.S. PATENT DOCUMENTS

| | | | | |
|---|---|---|---|---|
| 5,224,546 | A * | 7/1993 | Smith | C08K 5/175 507/926 |
| 8,092,720 | B2 * | 1/2012 | Hashimoto | C07D 307/84 502/166 |
| 2002/0022700 | A1 | 2/2002 | Chino et al. | |
| 2016/0199754 | A1 | 7/2016 | Donaldson et al. | |

FOREIGN PATENT DOCUMENTS

| | | | |
|---|---|---|---|
| CN | 110202327 | A | 9/2019 |
| EP | 0236796 | A2 | 9/1987 |
| JP | 2002317122 | A | 10/2002 |
| JP | 2004051814 | A * | 2/2004 |
| JP | 2005023225 | A | 1/2005 |
| JP | 2011006625 | A | 1/2011 |
| JP | 2016529282 | A | 9/2016 |
| JP | 2018150439 | A | 9/2018 |
| WO | 2008013009 | A1 | 1/2008 |

OTHER PUBLICATIONS

JP-2004051814-A Machine Translation (Year: 2004).*

Mar. 7, 2023, International Preliminary Report on Patentability issued in the International Patent Application No. PCT/JP2021/028672.

Feb. 1, 2024, search result of the Extended European Search Report issued by the European Patent Office in the corresponding European Patent Application No. 21864020.9.

Database WPI Week 201983 Thomson Scientific, London, GB; AN 2019-793557, XP002810871, 2019.

May 15, 2025, search result of Office Action issued by the China National Intellectual Property Administration in the corresponding Chinese Patent Application No. 202180054556.7.

Oct. 12, 2021, International Search Report issued in the International Patent Application No. PCT/JP2021/028672.

* cited by examiner

*Primary Examiner* — Terressa Boykin

(74) *Attorney, Agent, or Firm* — KENJA IP LAW PC

(57) ABSTRACT

A method for cleaving a coordinate bond of a complex polymer that contains at least one polymer chain and a plurality of nitrogen- and/or phosphorus-containing functional groups which are bonded to the polymer chain and capable of forming coordinate bonds, wherein the coordinately-bondable nitrogen- and/or phosphorus-containing functional groups form a coordinate bond via a metal ion, characterized in that the method includes dissolving the complex polymer in a solvent containing a free ligand, to cleave the coordinate bond.

20 Claims, No Drawings

METHOD FOR CLEAVING COORDINATE BOND OF COMPLEX POLYMER

TECHNICAL FIELD

The present invention relates to a method for cleaving a coordinate bond of a complex polymer.

BACKGROUND

Conventionally, most of vulcanized rubber products which have been used, such as used tires, were disposed as waste without being recycled. However, now it is an urgent task to recycle such waste of vulcanized rubber as used tires in terms of addressing environmental problems, facilitating resource-saving, and so on.

As a method for regenerating a vulcanized rubber, there is, for example, a conventionally known method for regenerating a vulcanized rubber by applying heat and shearing force to the vulcanized rubber by using a twin-screw extruder.

Further, PTL 1 proposes a technique of devulcanizing a vulcanized rubber and regenerating the rubber as an unvulcanized rubber.

CITATION LIST

Patent Literature

PTL 1: JP2005-023225 A

SUMMARY OF THE INVENTION

Technical Problem

However, in the prior art, a crosslinked product of polymer, such as a vulcanized rubber, inevitably deteriorates as a result of regeneration because the crosslinked product is regenerated by being treated under harsh conditions. A rubber product using a regenerated rubber has, for example, a problem that the rubber product performs poorly in physical properties such as breaking strength, as compared with a rubber product not using a regenerated rubber. Accordingly, there is still room for improvement in recycling a crosslinked product of polymer, such as a vulcanized rubber, whereby a further study thereon is being requested.

In view of this, an object of the present disclosure is to solve the prior art problem described above and provide a method capable of easily breaking down a crosslink of a polymer (such as rubber).

Solution to Problem

As a result of a keen study for solving the problems described above, the inventor of the present disclosure discovered that, for a specific complex polymer forming a coordinate bond via a metal ion, the crosslink therein can be easily broken down by dissolving the complex polymer in a solvent containing a free ligand. The present disclosure has been completed on the basis of the discovery. Specifically, the primary features of the present disclosure for achieving the aforementioned objects are as follows.

A method for cleaving a coordinate bond of a complex polymer according to the present disclosure is a method for cleaving a coordinate bond of a complex polymer that contains at least one polymer chain and a plurality of nitrogen- and/or phosphorus-containing functional groups which are bonded to the polymer chain and capable of forming coordinate bonds, wherein the coordinately-bondable nitrogen- and/or phosphorus-containing functional groups form coordinate bonds via a metal ion, characterized in that the method including dissolving the complex polymer in a solvent containing a free ligand, to cleave the coordinate bond.

Advantageous Effect

According to the present disclosure, it is possible to provide a method capable of easily breaking down a crosslink of a polymer.

DETAILED DESCRIPTION

Hereinafter, a method for cleaving a coordinate bond of a complex polymer according to the present disclosure will be demonstratively described in detail by way of embodiments thereof.

<Method for Cleaving Coordinate Bond of Complex Polymer>

A method for cleaving a coordinate bond of a complex polymer according to the present disclosure is a method for cleaving a coordinate bond of a complex polymer that contains at least one polymer chain and a plurality of nitrogen- and/or phosphorus-containing functional groups which are bonded to the polymer chain and capable of forming coordinate bonds, wherein the coordinately-bondable nitrogen- and/or phosphorus-containing functional groups form coordinate bonds via a metal ion, characterized in that the method including dissolving the complex polymer in a solvent containing a free ligand, to cleave the coordinate bond.

The complex polymer subjected to the method according to the present disclosure has at least one polymer chain and a plurality of nitrogen- and/or phosphorus-containing functional groups bonded to the polymer chain and capable of forming coordinate bonds, wherein the coordinately bondable nitrogen- and/or phosphorus-containing functional groups form coordinate bonds via a metal ion therebetween. The complex polymer has a crosslinking structure due to the nitrogen- and/or phosphorus-containing functional groups forming coordinate bonds via metal ion therebetween. When the complex polymer is dissolved in a solvent containing a free ligand, a ligand exchange reaction takes place and the free ligand forms a coordinate bond with the metal ion, whereby the coordinate bond of the complex polymer (more specifically, the coordinate bond between the metal ion and the nitrogen- and/or phosphorus-containing functional groups bonded to the polymer chain) can be easily cleaved and thus the crosslink between the polymer chains can be easily broken down. Accordingly, the complex polymer, which is a polymer having a crosslinking form that substitutes for sulfur crosslinking, is recyclable.

Conventional sulfur-vulcanized rubber has main chains connected by strong covalent bonds, and therefore it is difficult to cleave the crosslink and recover the original raw material therefrom. Regenerated rubber such as reclaimed rubber is known, but significant deterioration of the main chain occurs in the regenerated rubber. On the other hand, when the aforementioned complex polymer (i.e. the polymer in which the nitrogen- and/or phosphorus-containing functional groups bonded to the polymer chain(s) are crosslinked by the metal ion) is dissolved in a solution containing a free ligand, a ligand exchange reaction takes place, so that the crosslink is broken down and the polymer chain is dissolved.

Typical sulfur-vulcanized rubber, when it is subjected to the same conditions as described above, merely absorbs the solvent to swell, thereby failing to undergo decrosslinking. Accordingly, with the method of the present disclosure, the crosslink of the polymer can be easily broken down without necessitating treatments under severe conditions, whereby deterioration in the physical properties of the polymer chain can be well suppressed.

(Polymer Chain)

The complex polymer contains at least one polymer chain. In a case where the complex polymer has one polymer chain, the complex polymer forms coordinate bonding by way of a metal ion and thus is crosslinked within a molecule thereof. In a case where the complex polymer has two or more polymer chains, the complex polymer can form coordinate bonding by way of a metal ion and thus is crosslinked not only within a molecule thereof but also intermolecularly (between the polymer chains thereof). The complex polymer contains a plurality of nitrogen- and/or phosphorus-containing functional groups that are capable of forming coordinate bonds. The plurality of nitrogen- and/or phosphorus-containing functional groups may be bonded to either a single polymer chain or two or more polymer chains, respectively. The plurality of nitrogen- and/or phosphorus-containing functional groups may be of either the same type or different types.

The polymer chain preferably contains a conjugated diene unit and/or an olefin unit. That is, the polymer chain preferably contains a conjugated diene unit or an olefin unit or contains both a conjugated diene unit and an olefin unit.

The conjugated diene unit represents a monomer unit derived from a conjugated diene compound. The conjugated diene compound as a monomer preferably has 4 to 8 carbon atoms. Specific examples of the conjugated diene compound include 1,3-butadiene, isoprene, 1,3-pentadiene, 2,3-dimethyl-1,3-butadiene, and the like. The conjugated diene compound as a monomer preferably includes 1,3-butadiene and/or isoprene in terms of being satisfactorily elastomeric. A content of the conjugated diene unit in the polymer chain, which is not particularly restricted and may be 0 mol %, is preferably ≥0.1 mol %, more preferably ≥1 mol %, and may be 100 mol %. A complex polymer having excellent elastomeric properties can be obtained when the aforementioned content is ≥1 mol %.

The olefin unit represents a monomer unit derived from an olefin compound. The olefin compound as a monomer preferably has 2 to 10 carbon atoms. Specific examples of the olefin compound include: α-olefin such as ethylene, propylene, 1-pentene, 1-hexene, 1-heptene, 1-octene, and the like; a heteroatom-substituted alkene compound such as vinyl pivalate, 1-phenylthio ethene, N-vinylpyrrolidone; and the like.

A content of the olefin unit in the polymer chain, which is not particularly restricted and may be 0 mol %, is preferably ≥1 mol % and may be 100 mol %.

The polymer chain may further include a unit derived from another monomer which can be copolymerized with the conjugated diene compound and/or the olefin compound described above. Examples of a unit derived from another monomer include an aromatic vinyl unit, and the like. A content of the unit derived from another monomer in the polymer chain, which is not particularly restricted and may be 0 mol %, is preferably ≥1 mol % and ≤50 mol % in one embodiment.

The aromatic vinyl unit represents a monomer unit derived from an aromatic vinyl compound. The aromatic vinyl compound represents an aromatic compound substituted with at least vinyl group. The aromatic vinyl compound as a monomer preferably has 8 to 10 carbon atoms. Specific examples of the aromatic vinyl compound include styrene, α-methylstyrene, 2-methylstyrene, 3-methylstyrene, 4-methylstyrene, 2,4-dimethyl styrene, 2-ethylstyrene, 3-ethylstyrene, 4-ethylstyrene, and the like.

(Nitrogen- and/or Phosphorus-Containing Functional Group)

The complex polymer contains a plurality of nitrogen- and/or phosphorus-containing functional groups bonded to the polymer chain and capable of forming coordinate bonding. The coordinately-bondable nitrogen- and/or phosphorus-containing functional groups form coordinate bonding therebetween via a metal ion. With the coordinate bonding, reversibility can be sufficiently imparted to the bond between the metal ion and the nitrogen- and/or phosphorus-containing functional groups. Moreover, the coordinate bonding between the nitrogen- and/or phosphorus-containing functional groups and the metal ion is satisfactorily strong, whereby a crosslink with a strength equal to that of a sulfur crosslink can be formed and thus the complex polymer has satisfactorily high durability. Preferable examples of the functional group containing nitrogen include a group having a nitrogen-containing heterocyclic ring such as 4,5-dihydropyridazine ring, pyridine ring, pyrimidine ring, triazine ring, tetrazine ring, or the like. Examples of the functional group containing phosphorus include the groups obtained by replacing respective nitrogen atoms of the nitrogen-containing heterocyclic rings of the functional groups containing nitrogen described above, with phosphorus atoms.

In the present disclosure, it is preferable that the nitrogen- and/or phosphorus-containing functional group contains no sulfur atom. In a case where the nitrogen- and/or phosphorus-containing functional group contains no sulfur atom, crosslinking between the polymer chains by sulfur atoms can be prevented and therefore recyclability of the complex polymer improves.

In the complex polymer of the present disclosure, the bond dissociation energy for dissociation of the metal ion and the nitrogen- and/or phosphorus-containing functional group is preferably ≥200 kJ/mol, more preferably ≥250 kJ/mol, and preferably ≤500 kJ/mol. A crosslinked structure having high strength equivalent to that of sulfur crosslinking can be formed and thus satisfactorily high durability of the complex polymer is ensured when the aforementioned bond dissociation energy is ≥200 kJ/mol. The durability of the complex polymer further improves when the bond dissociation energy is ≥250 kJ/mol. The coordinate bond between the metal ion and the nitrogen-containing functional group can be more easily cleaved and thus the complex polymer can be more easily recycled than otherwise when the bond dissociation energy is ≤500 kJ/mol.

In the present disclosure, the bond dissociation energy for dissociation of the metal ion and the nitrogen-containing functional group represents a value measured in vacuum at the structure optimizing level of M06/6-31G(d, p)//B3PW91-D3/6-31G(d, p) or M06/6-31G(d, p). It is assumed that the metal ion and the nitrogen- and/or phosphorus-containing functional group form ionic aggregates. Gaussian09 or GRRM14 can be used for calculation of the bond dissociation energy.

The nitrogen- and/or phosphorus-containing functional group is preferably derived from a compound containing a triazine ring or a tetrazine ring. A compound containing a triazine ring or a tetrazine ring, which is reactive with the polymer chain, easily forms a functionalized polymer due to reactiveness thereof with the polymer chain. Further, a nitrogen-containing functional group derived from a compound containing a triazine ring or a tetrazine ring is easily complexed with a metal ion to form crosslinking, thereby successfully forming a crosslinked structure having high strength equivalent to that of sulfur crosslinking.

In the present disclosure, in a case where the nitrogen- and/or phosphorus-containing functional group is derived from a compound containing a triazine ring or a tetrazine ring, it is preferable that a pyridyl/pyrimidinyl group is bonded to the triazine/tetrazine ring of the compound. It is more preferable in this regard that two pyridyl/pyrimidinyl groups are bonded to the triazine/tetrazine ring. In a case where a pyridyl/pyrimidinyl group is bonded to the triazine/tetrazine ring, the nitrogen-containing functional group is more easily complexed with a metal ion, whereby the relevant bond dissociation energy is likely to be high and thus a crosslinked structure having higher strength, than otherwise, can be formed. Further, in a case where two pyridyl/pyrimidinyl groups are bonded to the triazine/tetrazine ring, the nitrogen-containing functional group is even more easily complexed with a metal ion, whereby the relevant bond dissociation energy is more likely to be high and thus a crosslinked structure having even higher strength, than otherwise, can be formed. The pyridyl group, which may be any of 2-pyridyl, 3-pyridyl, and 4-pyridyl, is preferably 2-pyridyl group. The pyrimidinyl group may be any of 2-pyrimidinyl, 4-pyrimidinyl, and 5-pyrimidinyl group.

The nitrogen- and/or phosphorus-containing functional group is preferably derived from a compound represented by general formula (1) shown below.

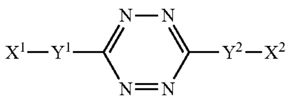

(1)

In the general formula (1), each of $X^1$ and $X^2$ independently represents a pyridyl/pyrimidinyl group, and each of $Y^1$ and $Y^2$ independently represents a single bond or a divalent hydrocarbon group.

The compound represented by the general formula (1) easily causes a Diels-Alder reaction between itself and a polymer chain, thereby easily forming a functionalized polymer. Further, in a case where the nitrogen- and/or phosphorus-containing functional group is derived from a compound represented by the general formula (1), the nitrogen-containing functional group is particularly easily complexed with a metal ion, whereby the relevant bond dissociation energy is even more likely to be high and thus a crosslinked structure having particularly high strength can be formed.

In the general formula (1), each of $X^1$ and $X^2$ independently represents a pyridyl/pyrimidinyl group. Each of $X^1$ and $X^2$ is preferably a pyridyl group in terms of making the synthesis process easy. The pyridyl group, which may be any of 2-pyridyl, 3-pyridyl, and 4-pyridyl, is preferably 2-pyridyl group. The pyrimidinyl group may be any of 2-pyrimidinyl, 4-pyrimidinyl, and 5-pyrimidinyl group.

In the general formula (1), each of $Y^1$ and $Y^2$ independently represents a single bond or a divalent hydrocarbon group. Examples of the divalent hydrocarbon group include alkylene, alkenylene, arylene groups, and the like. Specifically, examples of the alkylene group include methylene, ethylene, trimethylene, tetramethylene groups, and the like. Examples of the alkenylene group include vinylene, propenylene, butenylene groups, and the like. Examples of the arylene group include phenylene, tolylene, naphthylene groups, and the like. Each of $Y^1$ and $Y^2$ is preferably a single bond in terms of making the synthesis process easy (i.e., it is preferable that each of $X^1$ and $X^2$ is directly bonded to the tetrazine ring).

In the present disclosure, it is preferable that each of $X^1$ and $X^2$ is a pyridyl group and each of $Y^1$ and $Y^2$ is a single bond in the general formula (1). Not only the compound of the general formula (1) is easily available but also the functional group is particularly easily complexed with a metal ion, whereby the relevant bond dissociation energy is even more likely to be high and thus a crosslinked structure having particularly high strength can be formed, in this case.

Examples of the compound represented by the general formula (1) include 3,6-di(2-pyridyl)-1,2,4,5-tetrazine, 3,6-di(3-pyridyl)-1,2,4,5-tetrazine, 3,6-di(4-pyridyl)-1,2,4,5-tetrazine, 3,6-di(2-pyridylmethyl)-1,2,4,5-tetrazine, 3,6-di(2-pyridylethyl)-1,2,4,5-tetrazine, 3-(2-pyridylmethyl)-6-(2-pyridylethyl)-1,2,4,5-tetrazine, 3,6-di(2-pyrimidinyl)-1,2,4,5-tetrazine, 3,6-di(4-pyrimidinyl)-1,2,4,5-tetrazine, 3,6-di(5-pyrimidinyl)-1,2,4,5-tetrazine, and the like. 3,6-di(2-pyridyl)-1,2,4,5-tetrazine is preferable among those examples.

In the complex polymer of the present disclosure, the nitrogen- and/or phosphorus-containing functional group is bonded to the polymer chain by an amount of the functional group preferably in the range of 0.1 to 10 mol %, more preferably in the range of 0.3 to 8 mol %, even more preferably in the range of 0.4 to 5 mol %, and particularly preferably in the range of 0.5 to 3 mol %, with respect to the monomer units of the polymer chain. In a case where the nitrogen- and/or phosphorus-containing functional group is bonded to the polymer chain by an amount of the functional group of ≥0.1 mol %, with respect to the monomer units of the polymer chain, it is possible to form a crosslinked structure having high strength equivalent to that of sulfur crosslinking and thus obtain a complex polymer having satisfactorily high durability. In a case where the nitrogen- and/or phosphorus-containing functional group is bonded to the polymer chain by an amount of the functional group of 10 mol %, with respect to the monomer units of the polymer chain, a complex polymer which is satisfactorily elastomeric can be easily obtained.

(Metal Ion)

In the complex polymer, the coordinately-bondable nitrogen- and/or phosphorus-containing functional groups collectively form coordinate bonds via a metal ion. Any metal ion that can be coordinately bonded with the nitrogen- and/or phosphorus-containing functional groups can be used as the metal ion in the complex polymer.

The metal ion is preferably a metal ion of an element of group 7-10 in the Periodic Table and more preferably a metal ion of an element of group 8 in the Periodic Table in terms of capability of forming coordinate bonding with the nitrogen- and/or phosphorus-containing functional groups.

Specifically, examples of the element of group 7 include manganese, rhenium, and the like.

Examples of the element of group 8 include iron, ruthenium, osmium, and the like.

Examples of the element of group 9 include cobalt, rhodium, iridium, and the like.

Examples of the element of group 10 include nickel, palladium, platinum, and the like.

A metal ion of an element of group 7-10 in the Periodic Table is likely to form a strong bond with the nitrogen- and/or phosphorus-containing functional group, thereby successfully forming a crosslinked structure having high strength equivalent to that of sulfur crosslinking. Further, in a case where the metal ion is a metal ion of an element of group 8 in the Periodic Table, the coordinate bond between the metal ion and the nitrogen- and/or phosphorus-containing functional group is likely to be stronger than otherwise and thus formation of a crosslinked structure having higher strength, than otherwise, is ensured.

The valence number of a metal ion is not particularly restricted and may be set at any valence number which the element can take.

Iron ion is particularly preferable as the metal ion described above. Iron ion is likely to form a particularly strong bond with the nitrogen- and/or phosphorus-containing functional group, thereby making it possible to form a crosslinked structure having particularly high strength. The valence number of iron ion is preferably divalent ($Fe^{2+}$) or trivalent ($Fe^{3+}$).

The metal ion can form a coordinate bond with the nitrogen- and/or phosphorus-containing functional group by, for example, addition of a relevant metal salt to a polymer chain having the nitrogen- and/or phosphorus-containing functional group bonded thereto. A complex polymer can be easily obtained and thus formation of a crosslinked structure having high strength equivalent to that of sulfur crosslinking is easy in this case. The form of a metal salt to be added is not particularly restricted and may be a metal salt hydrate, for example. The metal salt is added by an amount thereof preferably in the range of 1 to 30 parts by mass, more preferably in the range of 1 to 15 parts by mass, even more preferably in the range of 1 to 10 parts by mass, and particularly preferably in the range of 1 to 5 parts by mass, with respect to 100 parts by mass of the polymer chain.

Examples of the metal salt include a metal halide, a metal sulfate, a metal nitrate, and the like. A metal halide is preferable among those examples. A metal halide is easy to handle and capable of forming a crosslinked structure having high strength equivalent to that of sulfur crosslinking.

Examples of the metal halide include a metal fluoride, a metal chloride, a metal bromide, a metal iodide, and the like. A metal chloride is preferable among those examples. A metal chloride is easy to handle and capable of forming a crosslinked structure having high strength equivalent to that of sulfur crosslinking.

Specific examples of the metal salt include $FeCl_2$, $FeCl_2{\cdot}4H_2O$, $FeCl_3$, $FeCl_3{\cdot}6H_2O$, and the like. Either a single type or combination of two or more types of those examples may be used as the metal salt.

(Method for Manufacturing Complex Polymer)

The complex polymer can be synthesized by, for example: causing a compound having a nitrogen- and/or phosphorus-containing functional group to react with a polymer chain, thereby forming a functionalized polymer in which the nitrogen- and/or phosphorus-containing functional group is bonded to the polymer chain; and causing the functionalized polymer to be complexed with a metal ion. In the present disclosure, the compound having a nitrogen- and/or phosphorus-containing functional group is preferably a compound containing a triazine ring or a tetrazine ring as described above and more preferably a compound represented by the general formula (1). In a rection between the polymer chain and the compound having a nitrogen- and/or phosphorus-containing functional group, it is preferable that the reaction conditions such as temperature, pressure, reaction time, and the like are optionally selected in accordance with types and reactivities of the polymer chain and/or the compound having a nitrogen- and/or phosphorus-containing functional group for use in the reaction. Further, in a reaction for causing the functionalized polymer to be complexed with a metal ion, it is preferable that the reaction conditions such as temperature, pressure, reaction time, and the like are optionally selected in accordance with types and reactivities of the functionalized polymer and the metal ion for use in the reaction.

A reaction scheme of functionalizing a polymer chain and causing a resulting functionalized polymer to be complexed with a metal ion when 3,6-di(2-pyridyl)-1,2,4,5-tetrazine is used as a compound having a nitrogen-containing functional group and ferrous chloride ($FeCl_2$) is used as a raw material of the metal ion, is shown below, as an example of the method for manufacturing the complex polymer.

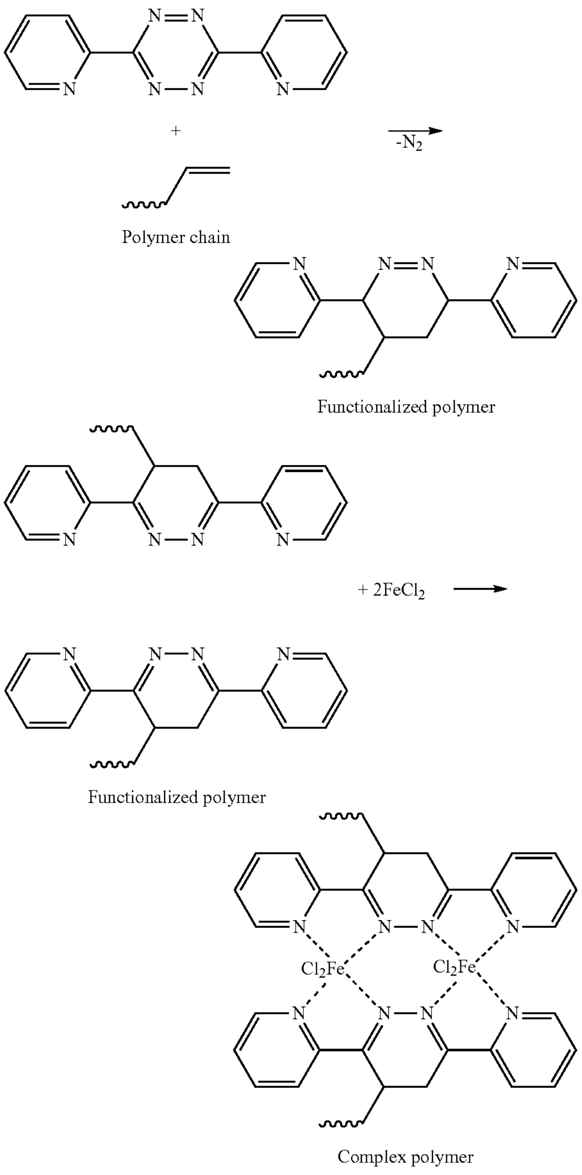

As is shown in the upper part of the reaction scheme, a functionalized polymer can be generated by a Diels-Alder reaction between a polymer chain having an unsaturated bond and a compound having a nitrogen-containing functional group. Although nitrogen is released in the Diels- Alder reaction in the example shown above, any other optional reaction may be utilized to carry out the functionalizing reaction of a polymer chain.

Further, as is shown in the lower part of the reaction scheme, the functionalized polymer is allowed to be complexed with and crosslinked by ferrous chloride, so that a complex polymer is generated. Although the reaction scheme shows a reaction in which nitrogen atoms in the tetrazine residue, a nitrogen atom in the pyridyl group bonded to the tetrazine residue, and an iron ion form coordinate bonds (i.e., those nitrogen atoms are complexed with and crosslinked by an iron ion), the complex polymer of the present disclosure may take a variety of complex forms.

The complex polymer may further include another functional group which is not coordinately bonded with the metal ion. Type of such another functional group as described above is not particularly restricted and may be optionally selected in accordance with physical properties or the like of a desired complex polymer.

The complex polymer may be prepared in advance by preliminarily synthesizing it as described above. Alternatively, the complex polymer may be synthesized in situ in the manufacturing process of a rubber composition.

For examples, the complex polymer can be generated by: mixing and kneading a polymer chain and a compound having a nitrogen- and/or phosphorus-containing functional group, thereby forming a functionalized polymer as the polymer main chain having the nitrogen- and/or phosphorus-containing functional group bonded thereto at a first stage of a mixing and kneading in the manufacturing process of a rubber composition; and adding a metal salt to the functionalized polymer and mixing and kneading them, thereby causing the functionalized polymer to be complexed with an metal ion, to form a complex polymer, at a second stage or a stage after the second stage of the mixing and kneading. Synthesis of the complex polymer and manufacturing a rubber composition can be simultaneously carried out in this case.

Alternatively, the complex polymer can be generated by: preliminarily preparing the functionalized polymer as the polymer chain(s) having the nitrogen- and/or phosphorus-containing functional groups bonded thereto; mixing and kneading the functionalized polymer and any optional compounding agent at a first stage of a mixing and kneading in the manufacturing process of a rubber composition; and adding a metal salt to the functionalized polymer and the like and mixing and kneading them, thereby causing the functionalized polymer to be complexed with an metal ion, to form a complex polymer, at a second stage or a stage after the second stage of the mixing and kneading. Synthesis of the complex polymer and manufacturing a rubber composition can be simultaneously carried out in this case, as well.

(Free Ligand)

A method for cleaving a coordinate bond of a complex polymer according to the present disclosure characteristically includes dissolving the complex polymer in a solvent containing a free ligand, to cleave the coordinate bond. When the complex polymer is dissolved in a solvent containing the free ligand, a ligand exchange reaction takes place between the complex polymer and the free ligand, so that the free ligand forms a coordinate bond with the metal ion. As a result, the crosslink of the complex polymer can be easily broken down.

In the present disclosure, the term "ligand" refers to a compound that is coordinately bonded to a metal. Typically, the ligand contains a group having a lone pair of electrons, whereby the group can be coordinately bonded with the metal to form a complex. The term "free ligand" refers to a ligand in a state of being not coordinately bonded to a metal or a polymer chain.

The free ligand is preferably a compound containing nitrogen and/or phosphorus. In the case where the free ligand is a compound containing nitrogen and/or phosphorus, a ligand exchange reaction is likely to occur between the complex polymer and the free ligand, whereby the free ligand readily forms a coordinate bond with the metal ion, such that the original coordinate bonds of the complex polymer can be cleaved more easily and the crosslink between the polymer chains can be broken down more easily than otherwise.

As the compound containing nitrogen and/or phosphorus, a nitrogen-containing aromatic compound is preferable. In the case where the free ligand is a nitrogen-containing aromatic compound, a ligand exchange reaction is more likely to occur between the complex polymer and the free ligand, whereby the free ligand more readily forms a coordinate bond with the metal ion, such that the original coordinate bonds of the complex polymer can be cleaved even more easily and the crosslink between the polymer chains can be broken down even more easily than otherwise.

As the nitrogen-containing aromatic compound, a nitrogen-containing aromatic heterocyclic compound is preferable. Examples of the nitrogen-containing aromatic heterocyclic compound include pyridine, pyrimidine, pyrazine, pyridazine, and the like. Among those examples, pyridine and pyrimidine are preferable from the viewpoint of easily forming a coordinate bond with the metal ion. In the case where the free ligand is selected from pyridine and pyrimidine, the crosslink between the polymer chains can be broken down particularly easily.

As the compound containing nitrogen and/or phosphorus, an amine compound is also preferable. An amine compound also easily undergoes a ligand exchange reaction with the complex polymer and easily forms a coordinate bond with the metal ion, so that the original coordinate bonds of the complex polymer can be cleaved more easily and the crosslink between the polymer chains can be broken down more easily than otherwise.

Examples of the amine compound include tetramethylethylenediamine (TMEDA), hexylamine, heptylamine, octylamine, aniline, and dimethylaniline.

Either a single type or combination of two or more types of the examples described above may be used as the free ligand. An amount of the free ligand to be used is preferably in the range of 1 part to 2,000 parts by mass, more preferably in the range of 20 parts to 1,500 parts by mass, even more preferably in the range of 30 parts to 1,300 parts by mass, and particularly preferably in the range of 50 parts to 1,100 parts by mass with respect to 100 parts by mass of the complex polymer. A ligand exchange reaction is likely to occur between the complex polymer and the free ligand when the amount of the free ligand to be used is set to be within the ranges described above.

From the viewpoint of easily breaking down the crosslink between the polymer chains, it is preferable that a content of the free ligand is larger than that of the metal salt to be blended therewith (i.e., larger than a content of the metal contained in the complex polymer). In this regard, specifically, more preferably ≤2 equivalents, even more preferably ≤4 equivalents, and particularly preferably ≤6 equivalents of the free ligand is to be used with respect to 1 equivalent of the metal salt. Since the ligand exchange reaction between the complex polymer and the free ligand is an equilibrium reaction, the exchange reaction is advantageously facilitated when the free ligand is contained by a relatively large content.

(Solvent)

As the solvent, any solvent may be used. The solvent is preferably capable of at least partially dissolving the free ligand. Either a single type or two or more types in combination may be used as the solvent.

The volume ratio of the free ligand with respect to the solvent (free ligand: solvent) is preferably in the range of 1:50 to 1:1. The free ligand is easily dissolved in the solvent when the volume ratio is set to be within the aforementioned range.

The amount of the solvent to be used is preferably in the range of 500 parts to 10,000 parts by mass with respect to 100 parts by mass of the complex polymer. The decrosslinked polymer chains are easily dissolved in the solvent when the amount of the solvent is set to be within the aforementioned range.

The solvent is preferably an organic solvent. The ligand exchange reaction between the complex polymer and the free ligand is an equilibrium reaction. The equilibrium reaction can be controlled easily by using an organic solvent as the solvent. Moreover, in the case where an organic solvent is used as the solvent, both the free ligand and the resulting decrosslinked polymer chains are easily dissolved in the solvent.

Examples of the organic solvent include tetrahydrofuran (THF), hexane, cyclohexane, pentane, cyclopentane, toluene, xylene, and the like. Among those examples, tetrahydrofuran, hexane, and cyclohexane are preferable in terms of ease of control of the equilibrium reaction. In the case where the organic solvent is selected from tetrahydrofuran, hexane, and cyclohexane, the equilibrium reaction (ligand exchange reaction) between the complex polymer and the free ligand can be controlled more easily than otherwise.

The temperature at which the complex polymer is dissolved in the solvent containing the free ligand is preferably equal to or lower than the boiling points of the free ligand and the solvent. The temperature may be at the room temperature but is preferably in the range of 40° C. to 65° C. The ligand exchange reaction is likely to occur between the complex polymer and the free ligand when the temperature is set to be within the aforementioned range.

It is preferable that the time during which the complex polymer is dissolved in the solvent containing the free ligand is selected as appropriate according to the types of the free ligand and the solvent, a molar ratio between the complex polymer and the free ligand, the temperature, and the like. The time is preferably 3 hours to 48 hours in one example.

The reaction scheme for cleaving, by using pyridine (Py) as the free ligand, the coordinate bonds of the complex polymer synthesized according to the aforementioned reaction scheme is shown below as an example of the reaction scheme for cleaving the coordinate bond.

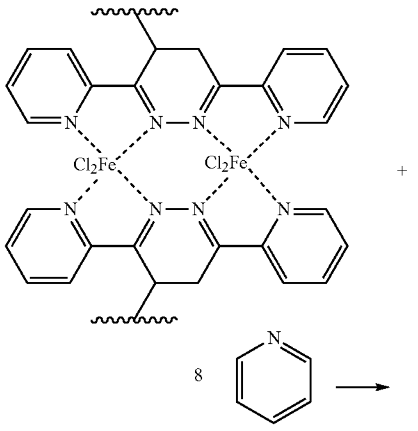

(Py)

-continued

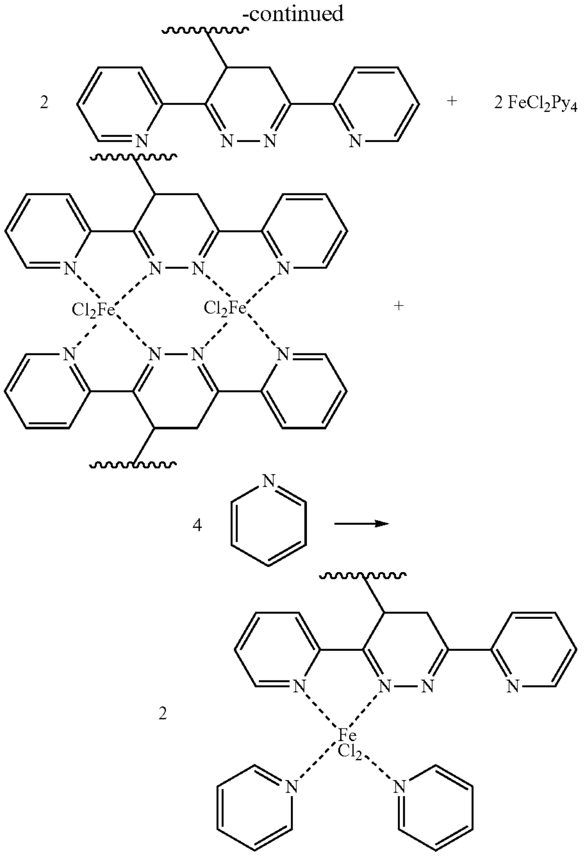

As shown in the upper part of the reaction scheme, the metal ion in the complex polymer is coordinately bonded to the free ligands, so that the metal ion can be dissociated from the nitrogen-containing functional groups of the polymer chains. The dissociation of the metal ion from the nitrogen-containing functional groups of the polymer chains cleaves the coordinate bonds of the complex polymer, thereby breaking down the crosslink between the polymer chains. Although the metal ion is completely dissociated from the nitrogen-containing functional groups of the polymer chains in the example in the upper part of the reaction scheme, it is acceptable that the metal ion is not completely dissociated from the nitrogen-containing functional groups of the polymer chains, as shown in the lower part of the reaction scheme.

In the lower part of the reaction scheme, one of the two polymer chains is dissociated as a result of some free ligands, instead of the one polymer chain, being coordinately bonded to the metal ion in the complex polymer. The crosslink between the polymer chains is successfully broken down because one of the two polymer chains has been dissociated. It should be noted that the coordinate bonding of the metal ion with the nitrogen-containing functional group of the polymer chain still partly exists in this case.

In one embodiment of the method according to the present disclosure, it is acceptable that either only one of the two schemes described above takes place or both of the two schemes take place simultaneously. The two reactions (reaction schemes) described above are normally in an equilibrium relationship and the state of equilibrium can be optionally adjusted by changing the types of the free ligand and the solvent, a molar ratio between the complex polymer and the free ligand, the temperature, and the like.

(Application of the Present Disclosure)

The method according to the present disclosure is applicable to various rubber products and resin products containing the above-described complex polymer. Examples of the rubber products include tires, anti-vibration rubbers, seismic isolation rubbers, belts (conveyor belts), rubber crawlers, hoses of various types, and the like. By applying the method according to the present disclosure to these rubber products, it is possible to cleave the coordinate bonds of the complex polymer in the rubber products, thereby successfully recovering the functionalized polymer and thus recycling the complex polymer.

(Application of Regenerated Polymer (Decrosslinked Polymer))

The functionalized polymer obtained by cleaving the coordinate bond of the complex polymer by the above-described method may be regenerated as the complex polymer by causing the functionalized polymer to be complexed with the metal ion. Alternatively, the functionalized polymer may be used for other purposes without being subjected to complexation.

The functionalized polymer obtained by cleaving the coordinate bond of the complex polymer and the complex polymer regenerated therefrom are applicable to various rubber products and resin products. Example of the rubber products include tires, anti-vibration rubbers, seismic isolation rubbers, belts (conveyor belts), rubber crawlers, hoses of various types, and the like.

EXAMPLES

The present disclosure will be described further in detail by Examples hereinafter. The present disclosure is not restricted by any means by these Examples.

<Method for Manufacturing Functionalized Polymer A>

A functionalized polymer sample (functionalized polymer A) was prepared by:

- dissolving 50 g of "TUFDENE™2000R" (styrene-butadiene rubber (SBR) as a polymer chain containing conjugated diene units), manufactured by Asahi Kasei Corporation, in 600 mL of THF in a glass bottle;
- adding 2.4 g (10 mmol) of 3,6-di(2-pyridyl)-1,2,4,5-tetrazine, manufactured by Tokyo Chemical Industry Co., Ltd., to the glass bottle and heating and refluxing the reaction mixture for 3 hours; and
- subjecting to a resulting solution to vacuum drying at 60° C. for 7 hours, thereby obtaining 50 g of functionalized polymer A.

A content of the nitrogen-containing functional group is 1.2 mol % with respect to the monomer units of the polymer chain in the functionalized polymer A thus obtained.

<Manufacturing Complex Polymer>

Rubber composition or complex polymer samples were prepared according to the blend formulations shown in Table 1 by using a conventional Banbury mixer. A first stage and a second stage of a mixing and kneading process were carried out in this order such that iron (II) chloride tetrahydrate was added to the mixture at the second stage of the mixing and kneading process, to form a complex polymer, in each of the Examples. The first stage of the mixing and kneading process was carried out at 140° C. for 3 minutes and the second stage of the mixing and kneading process was carried out at 80° C. for 1 minute.

The bond dissociation energy for dissociation of the iron ion and the nitrogen-containing functional group is 249.7 kJ/mol for the complex polymer in the rubber composition sample prepared for Example 1 and each of the complex polymer samples prepared for Examples 2 to 5.

<Decrosslinking of Vulcanized Rubber or Complex Polymer>

Each of the rubber composition samples of Comparative Example 1 and Example 1 and the complex polymer samples of Examples 2 to 5 was immersed in the relevant solvent containing the relevant free ligand shown in Table 1 at 65° C. for 12 hours, to perform a decrosslinking reaction. Pyridine or tetramethylethylenediamine (TMEDA) was used as the free ligand. Tetrahydrofuran (THF) or cyclohexane was used as the solvent, such that the volume ratio of the free ligand and the solvent (free ligand:solvent) was 1:9.

Regarding the amount of the free ligand used, 1 mL (980 phr) of pyridine was used with respect to 100 mg of rubber in Comparative Example 1 and Examples 1 to 3, and 1 mL (780 phr) of TMEDA was used with respect to 100 mg of rubber in Examples 4 and 5. In each of Comparative Example and Examples, the amount of the solvent (THF or cyclohexane) used was 10 mL.

The state of each of the rubber composition samples or the complex polymer samples after the decrosslinking reaction is shown in Table 1. In Table 1, "swelled" indicates that the rubber composition sample absorbed the solvent and swelled, and "dissolved" indicates that the rubber composition sample or the complex polymer sample dissolved in the solvent.

Further, the rubber composition sample or the complex polymer sample after the decrosslinking reaction was passed through a mesh with a mesh spacing of 1 mm, and the proportion at which the rubber composition sample or the complex polymer sample successfully passed through the mesh was determined. The results are shown in Table 1.

TABLE 1

| | | | Comparative Example 1 | Example 1 | Example 2 | Example 3 | Example 4 | Example 5 |
|---|---|---|---|---|---|---|---|---|
| Blend formulation (First stage of mixing and kneading) | Polymer *1 | parts by mass | 100 | — | — | — | — | — |
| | Functionalized polymer A *2 | | — | 100 | 100 | 100 | 100 | 100 |
| | Carbon black *3 | | 30 | 30 | — | — | — | — |
| | Oil *4 | | 10 | 10 | — | — | — | — |
| | Wax *5 | | 2 | 2 | — | — | — | — |
| | Antioxidant *6 | | 1 | 1 | — | — | — | — |
| | Stearic acid | | 2 | — | — | — | — | — |

TABLE 1-continued

| | | | Comparative Example 1 | Example 1 | Example 2 | Example 3 | Example 4 | Example 5 |
|---|---|---|---|---|---|---|---|---|
| Blend formulation (Second stage of mixing and kneading) | Iron (II) chloride tetrahydrate | parts by mass | — | 4 | 3 | 3 | 3 | 3 |
| | Sulfur | | 1.4 | — | — | — | — | — |
| | Vulcanization accelerator A *7 | | 0.7 | — | — | — | — | — |
| | Vulcanization accelerator B *8 | | 1.9 | — | — | — | — | — |
| | Zinc oxide | | 2.5 | — | — | — | — | — |
| Decrosslinking conditions | Solvent | — | THF | THF | THF | Cyclohexane | THF | Cyclohexane |
| | Free ligand | — | Pyridine | Pyridine | Pyridine | Pyridine | TMEDA | TMEDA |
| Physical properties | State after decrosslinking reaction | — | Swelled | Dissolved | Dissolved | Dissolved | Dissolved | Dissolved |
| | Proportion of passing through 1 mm mesh | mass % | 0 | 100 | 100 | 100 | 100 | 100 |

*1 Polymer: "TUFDENE 2000R" manufactured by Asahi Kasei Corporation, styrene-butadiene rubber (SBR)
*2 Functionalized polymer A: synthesized by the foregoing method
*3 Carbon black: "N234" manufactured by Tokai Carbon Co., Ltd.
*4 Oil: "JOMO PROCESS NC300BN" manufactured by JX Nippon Oil & Energy Corporation
*5 Wax: "SUNTIGHT A" manufactured by Seiko-Chemical Co., Ltd.
*6 Antioxidant: "Nocrac 6C" manufactured by Ouchi Shinko Chemical Industrial Co., Ltd.
*7 Vulcanization accelerator A: bis(2-benzothiazolyl)persulfide
*8 Vulcanization accelerator B: N-tert-butyl-2-benzothiazolylsulfenamide As can be understood from Table 1, with the methods of Examples according to the present disclosure, the crosslink structure of a complex polymer having the coordinate bonds formed via the metal ion can be easily broken down by dissolving the complex polymer in the solvent containing the free ligand.

INDUSTRIAL APPLICABILITY

A method for cleaving a coordinate bond of a complex polymer according to the present disclosure can be used to recycle polymers.

The invention claimed is:

1. A method for cleaving a coordinate bond of a complex polymer that contains at least two polymer chains and a plurality of nitrogen- and/or phosphorus-containing functional groups which are bonded to the polymer chains and capable of forming coordinate bonds, the complex polymer containing a conjugated diene unit and/or an olefin unit, wherein the coordinately-bondable nitrogen- and/or phosphorus-containing functional groups form coordinate bonds via a metal ion intramolecularly and intermolecularly, thereby forming a crosslink between the polymer chains, so that the complex polymer constitutes a rubber, characterized in that the method comprises:

dissolving the complex polymer in a solvent containing a free ligand, to cleave the coordinate bond of the complex polymer by a ligand exchange reaction between the free ligand and the complex polymer, thereby either completely or partially dissociating the metal ion from the plurality of nitrogen- and/or phosphorus-containing functional groups and breaking down the crosslink between the polymer chains of the rubber, and wherein the method involves no hydrolysis.

2. The method for cleaving a coordinate bond of a complex polymer according to claim 1, wherein the plurality of nitrogen- and/or phosphorus-containing functional groups contain no sulfur atom.

3. The method for cleaving a coordinate bond of a complex polymer according to claim 1, wherein plurality of the nitrogen- and/or phosphorus-containing functional groups are derived from a compound containing a triazine ring or a tetrazine ring.

4. The method for cleaving a coordinate bond of a complex polymer according to claim 3, wherein a pyridyl group or a pyrimidinyl group is bonded to the triazine ring or the tetrazine ring.

5. The method for cleaving a coordinate bond of a complex polymer according to claim 4, wherein two pyridyl groups or pyrimidinyl groups are bonded to the triazine ring or the tetrazine ring.

6. The method for cleaving a coordinate bond of a complex polymer according to claim 3, wherein the plurality of nitrogen- and/or phosphorus-containing functional groups are derived from a compound represented by general formula (1) shown below:

(1)

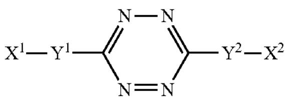

in the general formula (1), each of $X^1$ and $X^2$ independently represents a pyridyl/pyrimidinyl group, and each of $Y^1$ and $Y^2$ independently represents a single bond or a divalent hydrocarbon group.

7. The method for cleaving a coordinate bond of a complex polymer according to claim 6, wherein each of $X^1$ and $X^2$ is a pyridyl group and each of $Y^1$ and $Y^2$ is a single bond in the general formula (1).

8. The method for cleaving a coordinate bond of a complex polymer according to claim 1, wherein the metal ion is selected from metal ions of elements of Groups 7 to 10 in the Periodic Table.

9. The method for cleaving a coordinate bond of a complex polymer according to claim 8, wherein the metal ion is a metal ion of an element of Group 8 in the Periodic Table.

10. The method for cleaving a coordinate bond of a complex polymer according to claim 9, wherein the metal ion is an iron ion.

11. The method for cleaving a coordinate bond of a complex polymer according to claim 1, wherein the plurality of nitrogen- and/or phosphorus-containing functional groups are bonded to the polymer chains by an amount of the functional groups in the range of 0.1 mol % to 10 mol % with respect to a monomer unit in the polymer chains.

12. The method for cleaving a coordinate bond of a complex polymer according to claim 1, wherein a bond dissociation energy for dissociation of the metal ion and the plurality of nitrogen- and/or phosphorus-containing functional groups is 200 kJ/mol or more.

13. The method for cleaving a coordinate bond of a complex polymer according to claim 1, wherein the free ligand is a compound containing nitrogen and/or phosphorus.

14. The method for cleaving a coordinate bond of a complex polymer according to claim 13, wherein the compound containing nitrogen and/or phosphorus is a nitrogen-containing aromatic compound.

15. The method for cleaving a coordinate bond of a complex polymer according to claim 14, wherein the nitrogen-containing aromatic compound is selected from pyridine and pyrimidine.

16. The method for cleaving a coordinate bond of a complex polymer according to claim 13, wherein the compound containing nitrogen and/or phosphorus is an amine compound.

17. The method for cleaving a coordinate bond of a complex polymer according to claim 1, wherein the solvent is an organic solvent.

18. The method for cleaving a coordinate bond of a complex polymer according to claim 17, wherein the organic solvent is selected from tetrahydrofuran, hexane, and cyclohexane.

19. The method for cleaving a coordinate bond of a complex polymer according to claim 1, wherein the solvent is exclusively a non-aqueous organic solvent.

20. The method for cleaving a coordinate bond of a complex polymer according to claim 1, wherein the free ligand is selected from pyridine and pyrimidine.

* * * * *